United States Patent
Hashimoto et al.

(10) Patent No.: US 11,936,675 B2
(45) Date of Patent: Mar. 19, 2024

(54) ESTIMATION METHOD, ESTIMATION DEVICE, AND ESTIMATION PROGRAM

(71) Applicant: NIPPON TELEGRAPH AND TELEPHONE CORPORATION, Tokyo (JP)

(72) Inventors: Junko Hashimoto, Musashino (JP); Tsuneko Kura, Musashino (JP); Satoshi Takahashi, Musashino (JP); Megumi Uesu, Musashino (JP); Koji Kishi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 464 days.

(21) Appl. No.: 17/272,938

(22) PCT Filed: Aug. 20, 2019

(86) PCT No.: PCT/JP2019/032393
§ 371 (c)(1),
(2) Date: Mar. 3, 2021

(87) PCT Pub. No.: WO2020/050006
PCT Pub. Date: Mar. 12, 2020

(65) Prior Publication Data
US 2021/0320942 A1    Oct. 14, 2021

(30) Foreign Application Priority Data
Sep. 5, 2018 (JP) ................. 2018-166433

(51) Int. Cl.
*H04L 9/40* (2022.01)

(52) U.S. Cl.
CPC ............... *H04L 63/1433* (2013.01)

(58) Field of Classification Search
CPC ...... H04L 63/1433; H04L 63/00; G06F 21/55; G06F 21/57
See application file for complete search history.

(56) References Cited

U.S. PATENT DOCUMENTS

2008/0189788 A1* 8/2008 Bahl .................. H04L 63/1416
726/25
2011/0264608 A1* 10/2011 Gonsalves ............... G06N 7/01
706/10

(Continued)

FOREIGN PATENT DOCUMENTS

| JP | 2010-26662 A | 2/2010 |
| JP | 2015-95159 A | 5/2015 |

OTHER PUBLICATIONS

Cheng et al., "Risk Assessment of Information System using the Shell Theory and Attack Graph", Jul. 2010, 3rd International Conference on Computer Science and Information Technology, pp. 537-541 (Year: 2010).*

*Primary Examiner* — Kenneth W Chang
(74) *Attorney, Agent, or Firm* — XSENSUS LLP

(57) ABSTRACT

An estimation device (10) receives a device ID for identifying a device in a network and an observation event that has occurred in the device from a user terminal (20) as an input. The estimation device (10) acquires attribute information of the device corresponding to the received device ID from a device information storage unit (13c), estimates a risk that the device in the network is subject to an attack on the basis of the acquired attribute information and the received observation event, and outputs the estimated attack risk to the user terminal (20).

20 Claims, 12 Drawing Sheets

(56) References Cited

U.S. PATENT DOCUMENTS

| | | | |
|---|---|---|---|
| 2013/0298242 A1* | 11/2013 | Kumar | H04L 63/0209 |
| | | | 726/25 |
| 2015/0381649 A1* | 12/2015 | Schultz | G06Q 10/0635 |
| | | | 726/25 |
| 2016/0036846 A1* | 2/2016 | Oliphant | G06F 21/55 |
| | | | 726/23 |
| 2017/0054751 A1* | 2/2017 | Schneider | H04L 63/1441 |
| 2018/0183827 A1* | 6/2018 | Zorlular | H04L 63/1416 |

* cited by examiner

Fig. 2

| INCIDENT ID | TARGET DEVICE ID | OBSERVATION EVENT ITEM |
|---|---|---|
| 1 | Web SERVER 1 | DECREASE IN RESPONSE SPEED |
| ... | ... | ... |

Fig. 3

ATTRIBUTE INFORMATION

| ATTRIBUTE TYPE | ATTRIBUTE VALUE |
|---|---|
| DEVICE TYPE | SERVER |
| | Web SERVER |
| | NTP SERVER |
| | AP SERVER |
| | DB SERVER |
| | FILE SERVER |
| | LOG MANAGEMENT SERVER |
| | CLIENT PC |
| | OPERATION PC |
| | FW |
| | L2SW |
| OS TYPE | Windows Server 2016 |
| | Windows 10 |
| | CentOS 7.5 |
| MIDDLEWARE | Apache HTTP Server 2.4.33 |
| | postgerSQL 9.2.24 |
| APPLICATION | MAILER |
| | BROWSER |
| | IE11.0 |
| SERVICE TYPE | SERVER OF COMPANY A |

Fig. 4

DEVICE INFORMATION

| DEVICE ID | ATTRIBUTE TYPE | ATTRIBUTE VALUE |
|---|---|---|
| Web SERVER 1 | DEVICE TYPE | SERVER |
| Web SERVER 1 | DEVICE TYPE | Web SERVER |
| Web SERVER 1 | OS TYPE | Windows Server 2016 |
| Web SERVER 1 | MIDDLEWARE | apache ver.xxx |
| AP SERVER 1 | DEVICE TYPE | SERVER |
| AP SERVER 1 | DEVICE TYPE | AP SERVER |
| AP SERVER 1 | OS TYPE | Windows Server 2016 |
| AP SERVER 1 | MIDDLEWARE | tomcat ver.xxx |
| AP SERVER 2 | DEVICE TYPE | AP SERVER |
| TANAKA PC 1 | DEVICE TYPE | CLIENT PC |
| TANAKA PC 1 | OS TYPE | |
| TANAKA PC 1 | APPLICATION | MAILER |
| ... | ... | ... |

Fig. 5

OBSERVATION EVENT INFORMATION

| TARGET ATTRIBUTE VALUE | ATTRIBUTE TYPE | ATTACK TYPE | OBSERVATION EVENT ITEM | PROBABILITY |
|---|---|---|---|---|
| SERVER | DEVICE TYPE | DDoS | INCREASE IN NETWORK TRAFFIC | 10% |
| SERVER | DEVICE TYPE | DDoS | DECREASE IN RESPONSE SPEED | 10% |
| MAILER | APPLICATION | TARGETED ATTACK | ATTACHMENT FILE OF SUSPICIOUS MAIL WAS OPEN AND SUSPICIOUS OPERATION OCCURRED | 40% |
| BROWSER | APPLICATION | TARGETED ATTACK | ACCESS TO SUSPICIOUS WEBSITE | 50% |

Fig. 6

OBSERVATION EVENT INFORMATION A

| TARGET ATTRIBUTE VALUE | ATTRIBUTE TYPE | ATTACK TYPE | OBSERVATION EVENT ITEM | PROBABILITY |
|---|---|---|---|---|
| SERVER | DEVICE TYPE | DDoS | INCREASE IN NETWORK TRAFFIC | 10% |

DEVICE INFORMATION B

| DEVICE ID | ATTRIBUTE TYPE | ATTRIBUTE VALUE |
|---|---|---|
| Web SERVER 1 | DEVICE TYPE | SERVER |
| Web SERVER 1 | DEVICE TYPE | Web SERVER |
| Web SERVER 1 | OS TYPE | Windows Server 2016 |
| Web SERVER 1 | MIDDLEWARE | apache ver.xxx |

Fig. 9

OBSERVATION EVENT INFORMATION

| STATE NAME | ATTRIBUTE TYPE | TARGET ATTRIBUTE VALUE/TARGET DEVICE ID | ATTACK TYPE | STATE TRANSITION DIAGRAM NAME | APPLICATION OF OBSERVATION EVENT ITEM TO STATE PROBABILITY | INITIAL PROBABILITY |
|---|---|---|---|---|---|---|
| UNAUTHORIZED ACCESS TO SERVLET CONTAINER MANAGEMENT SCREEN | DEVICE TYPE | AP SERVER | | | YES | |
| INTRUSION TO AP SERVER | DEVICE TYPE | AP SERVER | INTRUSION | STATE TRANSITION DIAGRAM 1 | NO | |
| ⋮ | ⋮ | ⋮ | ⋮ | ⋮ | ⋮ | ⋮ |

TRANSITION DESTINATION LIST

| TRANSITION DESTINATION STATE NAME | TRANSITION DESTINATION STATE TRANSITION DIAGRAM NAME | TRANSITION PROBABILITY CALCULATION METHOD | OBSERVATION EVENT LIST | | | |
|---|---|---|---|---|---|---|
| | | | OBSERVATION EVENT ITEM | OBSERVATION EVENT TYPE | INITIAL VALUE | PROBABILITY |
| INTRUSION TO AP SERVER | | ADDITION | UNEXAMINED | UNEXAMINED | ON | 30% |
| | | | ATTACK FILE WAS UPLOADED THROUGH MANAGEMENT SCREEN | EXAMINATION ITEM | OFF | 40% |
| ⋮ | ⋮ | ⋮ | ⋮ | ⋮ | ⋮ | ⋮ |

Fig. 11

DEVICE INFORMATION B

| DEVICE ID | ATTRIBUTE TYPE | ATTRIBUTE VALUE |
|---|---|---|
| AP SERVER 1 | DEVICE TYPE | SERVER |
| AP SERVER 1 | DEVICE TYPE | AP SERVER |
| AP SERVER 1 | OS TYPE | Windows Server 2016 |
| AP SERVER 1 | MIDDLEWARE | tomcat ver.xxx |

ESTIMATION METHOD, ESTIMATION DEVICE, AND ESTIMATION PROGRAM

CROSS-REFERENCE TO RELATED APPLICATIONS

The present application is based on PCT filing PCT/JP2019/032393, filed Aug. 20, 2019, which claims priority to JP 2018-166433, filed Sep. 5, 2018, the entire contents of each are incorporated herein by reference.

TECHNICAL FIELD

The present invention relates to an estimation method, an estimation device, and an estimation program.

BACKGROUND ART

Responding to a crisis such as a cyber incident requires an advanced knowledge such as forensics, and there are many cases where a small-scale company does not know how to deal with such a crisis. Moreover, a cyber incident may often cause a great trouble in providing services and continuing business and appropriate and urgent determination by executives is required. However, there is few executives having advanced knowledge related to an information system and cyber attacks, the damage may extend as the determination is delayed.

Conventionally, as a preventive measure for a cyber incident, an attempt has been made to reduce vulnerability in advance and prepare operation rules by security design or the like and apply patches frequently using vulnerability information obtained from Japan vulnerability notes (JVN) and perform user education. However, since it is not possible to reduce the occurrence probability of a cyber incident to zero even when such a countermeasure is taken, a mechanism for assisting a countermeasure after the occurrence is required.

As a countermeasure taken after a cyber incident occurs, an evaluation method or the like for estimating the risk of secondary infection on the basis of path information on a network, for example, is known (for example, see Patent Literature 1).

CITATION LIST

Patent Literature

[PTL 1] Japanese Patent Application Publication No. 2015-95159

SUMMARY OF THE INVENTION

Technical Problem

However, the conventional method has a problem that at a time point when a small event (an observation event) likely to lead to a cyber incident occurs, it is not possible to detect which attack will occur at an early stage. For example, in the evaluation method of estimating the risk of secondary infection, analysis starts with receiving the type of attack and the designation of a terminal infected primarily, and it can be said that this is the stage in which a user or a system administrator is conscious of "a cyber incident having occurred already". Therefore, in actual cases such as a targeted attack, there are often cases where the damage has extended and it is too late when the person concerned has noticed the attack.

Means for Solving the Problem

In order to solve the problems and attain the object, an estimation method according to the present invention is an estimation method executed by an estimation device, including: a receiving step of receiving a device ID for identifying a device in a network and an observation event that has occurred in the device as an input; an estimation step of acquiring attribute information of a device corresponding to the device ID received in the receiving step from a device information storage unit and estimating a risk that the device in the network is subject to an attack on the basis of the acquired attribute information and the observation event received in the receiving step; and an output step of outputting an estimation result obtained in the estimation step.

An estimation device according to the present invention includes: a receiving unit that receives a device ID for identifying a device in a network and an observation event that has occurred in the device as an input; an estimation unit that acquires attribute information of a device corresponding to the device ID received by the receiving unit from a device information storage unit and estimates a risk that the device in the network is subject to an attack on the basis of the acquired attribute information and the observation event received by the receiving unit; and an output unit that outputs an estimation result obtained by the estimation unit.

An estimation program according to the present invention causes a computer to execute: a receiving step of receiving a device ID for identifying a device in a network and an observation event that has occurred in the device as an input; an estimation step of acquiring attribute information of a device corresponding to the device ID received in the receiving step from a device information storage unit and estimating a risk that the device in the network is subject to an attack on the basis of the acquired attribute information and the observation event received in the receiving step; and an output step of outputting an estimation result obtained in the estimation step.

Effects of the Invention

According to the present invention, an effect that it is possible to detect which attack will occur at an early stage at a time point when an observation event likely to lead to a cyber incident occurs.

BRIEF DESCRIPTION OF DRAWINGS

FIG. 2 is a diagram illustrating an example of data stored in an incident information storage unit.

FIG. 3 is a diagram illustrating an example of data stored in an attribute information storage unit.

FIG. 4 is a diagram illustrating an example of data stored in a device information storage unit.

FIG. 5 is a diagram illustrating an example of data stored in an observation event information storage unit.

FIG. 6 is a diagram illustrating a risk estimation process by the estimation device according to the first embodiment.

FIG. 8 is a diagram illustrating an example of data stored in the observation event information storage unit.

FIG. 11 is a diagram illustrating an example of device information retrieval results.

DESCRIPTION OF EMBODIMENTS

Hereinafter, an embodiment of an estimation method, an estimation device, and an estimation program according to the present application will be described in detail with reference to the drawings. The estimation method, the estimation device, and the estimation program according to the present application are not limited to this embodiment.

[First embodiment] In the following embodiment, a configuration of an estimation device 10 according to the first embodiment and the flow of processing of the estimation device 10 will be described sequentially, and the effects of the first embodiment will be described finally.

Figure 1:
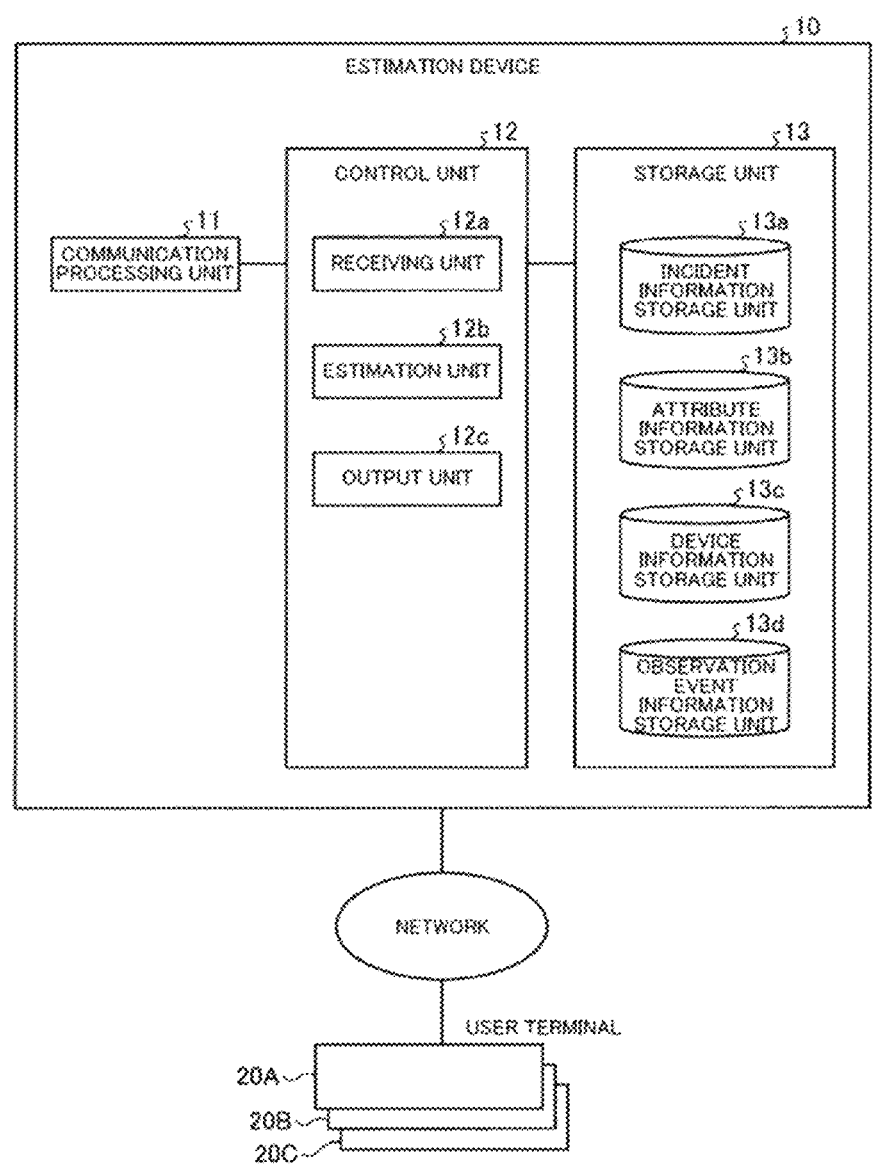
FIG. 1 is a block diagram illustrating a configuration example of a system including an estimation device according to a first embodiment.

[Configuration of estimation device] First, a configuration example of a system including the estimation device 10 of the present embodiment will be described with reference to FIG. 1. FIG. 1 is a block diagram illustrating a configuration example of a system including an estimation device according to the first embodiment. As illustrated in FIG. 1, for example, this system includes the estimation device 10 and a plurality of user terminals 20A to 20C. The estimation device 10 and the user terminal 20 are connected via a network such as the Internet. The configuration illustrated in FIG. 1 is an example only, and a specific configuration and the number of devices are not particularly limited. The user terminals 20A to 20C will be referred to as a user terminal 20 when the terminals are described without discrimination particularly. Although the system illustrated in FIG. 1 is a client-server system, the system may be a stand-alone system.

The estimation device 10 is a server device that estimates the risk that a device in an observation target network will be subject to attack and outputs the estimated attack risk to the user terminal 20. Specifically, the estimation device 10 receives a device ID for identifying a device in a network and an observation event occurred in the device from the user terminal 20 as an input. The estimation device 10 may register incident information which associates an incident ID with a pair of a device ID and an observation event therein in advance and may be able to designate a device ID and an observation event by receiving the input of an incident ID from the user terminal 20.

The estimation device 10 estimates the risk that a device in a network will be subject to attack on the basis of the observation event and the attribute information of the device corresponding to the device ID and outputs the estimated attack risk to the user terminal 20. That is, the estimation device 10 estimates which device is under which attack on the basis of input information indicating which observation event has occurred in a certain device and outputs the estimation result to the user terminal 20.

The user terminal 20 is a device such as a personal computer (PC) or a smartphone, and for example, is a device used by a user in an information system department of a company that provides a network service. After notifying of input information indicating which observation event has occurred in a certain device, the user terminal 20 sends a risk estimation request to the estimation device 10, receives the estimation result from the estimation device, and displays the estimation result. For example, the user terminal 20 displays the type of attack a device is likely to be subject to and the probability of being subject to the attack as the estimation result.

A configuration of the estimation device 10 will be described with reference to FIG. 1. As illustrated in FIG. 1, the estimation device 10 includes a communication processing unit 11, a control unit 12, and a storage unit 13. Processing of each unit of the estimation device 10 will be described below.

The communication processing unit 11 controls communication related to various pieces of information. For example, the communication processing unit 11 receives a device ID for identifying a device in a network and an observation event occurred in the device from the user terminal 20 as the input information and transmits the type of attack the device is likely to be subject to and the probability of being subject to the attack to the user terminal 20 as the estimation result.

The storage unit 13 stores data and programs necessary for various kinds of processing of the control unit 12, and includes an incident information storage unit 13a, an attribute information storage unit 13b, a device information storage unit 13c, and an observation event information storage unit 13d as those closely and particularly related to the present invention. For example, the storage unit 13 is a semiconductor memory element such as a random access memory (RAM) or a flash memory or a storage device such as a hard disk or an optical disc.

The incident information storage unit 13a stores incident information that associates an incident ID with a pair of a device ID and an observation event. It is assumed that the incident ID and the pair of the device ID and the observation event are designated and registered by the user terminal 20.

For example, as illustrated in FIG. 2, the incident information storage unit 13a stores an "incident ID" for uniquely identifying incidents, a "target device ID" for identifying a device in which a certain observation event has occurred, and an "observation event item" indicating the content of an observation event in correlation. FIG. 2 is a diagram illustrating an example of data stored in the incident information storage unit.

The attribute information storage unit 13b stores attribute information in which attribute values of a device such as a device type, firmware, an OS, or an installed application are defined for each attribute type. For example, as illustrated in FIG. 3, the attribute information storage unit 13b stores an "attribute value" in correlation with an "attribute type" indicating the type of attribute information. Referring to the example of FIG. 3, the attribute information storage unit 13b stores attribute values of "server", "web server", and the like in correlation with an attribute type of "device type", for example. Moreover, as illustrated in FIG. 3, the attribute information storage unit 13b stores an attribute value of "Windows (registered trademark) Server 2016" or the like in correlation with an attribute type of "OS type". The information stored in the attribute information storage unit 13b is information referred to when setting an attribute type and an attribute value corresponding to a device ID, for example. FIG. 3 is a diagram illustrating an example of the data stored in the attribute information storage unit.

The device information storage unit 13c stores device information indicating which attribute a device in an observation target network has. For example, as illustrated in FIG. 4, the device information storage unit 13c stores a "device ID" for uniquely identifying devices, an "attribute type", and an "attribute value" in correlation. Referring to the example of FIG. 4, the device information storage unit 13c stores an attribute type of "device type", an attribute value of "server" and "web server" in correlation with a device ID of "web server 1", for example. This means that the attribute values of the "device type" of Web server 1 are "server" and "web server". FIG. 4 is a diagram illustrating an example of the data stored in the device information storage unit.

The observation event information storage unit 13d stores observation event information in which an observation event that is likely to occur when being subject to attack is defined for each piece of attribute information. Specifically, the observation event information storage unit 13d stores the type of attack that a device is likely to be subject to and the probability of being subject to the attack in correlation with an observation event occurred in a device. For example, as illustrated in FIG. 5, the observation event information storage unit 13d stores a "target attribute value" indicating an attribute value of a device, an "attribute type" indicating the attribute information of a device, an "attack type" indicating the type of attack, an "observation event item" indicating the content of an observation event occurred in a device, and a "probability" indicating the probability of being subject to attack in correlation. Referring to the example of FIG. 5, the observation event information storage unit 13d stores a target attribute value of "server", an attribute type of "device type", an attack type of "DDoS", an observation event item of "increase in network traffic", and a probability of "10%" in correlation, for example. FIG. 5 is a diagram illustrating an example of the data stored in the observation event information storage unit.

The control unit 12 has an internal memory for storing necessary data and programs that define various processing procedures and includes a receiving unit 12a, an estimation unit 12b, and an output unit 12c as those closely and particularly related to the present invention, with which various kinds of processing are executed. The control unit 12 is an electronic circuit such as a central processing unit (CPU) or a micro processing unit (MPU) or an integrated circuit such as an application specific integrated circuit (ASIC) or a field programmable gate array (FPGA).

The receiving unit 12a receives a device ID for identifying a device in a network and an observation event occurred in the device from the user terminal 20 as an input. For example, the receiving unit 12a may register incident information which associates an incident ID with a pair of a device ID and an observation event therein in advance and may receive the input of an incident ID from the user terminal 20. In this case, the receiving unit 12a receives incident information that associates an incident ID with a pair of a device ID and an observation event from the user terminal 20 in which an incident input screen is displayed and stores the incident information in the incident information storage unit 13a. The receiving unit 12a receives the input of an incident ID included in a risk estimation request from the user terminal 20 in which a risk estimation screen is displayed and notifies the estimation unit 12b of the incident ID.

The estimation unit 12b acquires attribute information of a device corresponding to the device ID received by the receiving unit 12a from the device information storage unit 13c and estimates the risk that a device in a network is subject to attack on the basis of the acquired attribute information and the observation event received by the receiving unit 12a. For example, upon receiving the incident ID from the receiving unit 12a, the estimation unit 12b acquires the device ID and the observation event corresponding to the incident ID from the incident information storage unit 13a. The estimation unit 12b acquires the attribute information of the device corresponding to the acquired device ID from the device information storage unit 13c and acquires the type of attack and the probability of being subject to the attack corresponding to the attribute information acquired from the device information storage unit 13c and the observation event received by the receiving unit 12a from the observation event information storage unit 13d. The estimation unit 12b notifies the output unit 12c of the acquired attack type and the probability.

The output unit 12c outputs the attack risk which is the estimation result estimated by the estimation unit 12b. For example, the output unit 12c outputs the attack type and the probability of being subject to the attack acquired by the estimation unit 12b to the user terminal 20 as the risk estimation result.

Here, an example of a risk estimation process by the estimation device 10 according to the first embodiment will be described with reference to FIG. 6. FIG. 6 is a diagram illustrating a risk estimation process by the estimation device according to the first embodiment. In the example of FIG. 6, it is assumed that the estimation device 10 receives a device ID of "web server 1" and an observation event of "increase in network traffic" as the input information. In such a case, as illustrated in FIG. 6, the estimation device 10 retrieves records matching the observation event of "increase in network traffic", for example, from the observation event information storage unit 13d (see observation event information A in FIG. 6).

Subsequently, the estimation device 10 retrieves records matching the device ID of "web server 1" from the device information storage unit 13c. As a result, the estimation device 10 acquires "device type" of "server" and "web server", "OS type" of "Windows Server 2016", and "middleware" of "apache ver.xxx" from the device information storage unit 13c as the attribute information (attribute type and attribute value) corresponding to the device ID of "web server 1" (see device information B in FIG. 6).

The estimation device 10 acquires "attack type" and "probability" of the record of the observation event information A having the same attribute information (attribute type, attribute value) among the retrieved observation event information A and device information B. In the example of FIG. 6, since the record of "device type" and "server" is present in the observation event information A and the device information B, the estimation device 10 acquires the attack type "DDoS" and the probability "10%" of the record of the observation event information A. In this way, the estimation device 10 obtains an estimation result that the probability of the Web server 1 being subject to DDoS attack is 10%. Although a case where the number of corresponding records of the observation event information A is 1 has been described, when there are a number of corresponding records, the estimation device 10 may sum the probabilities and may output the probabilities. For example, the estimation device 10 may sum the probabilities when there are a number of same attack types and may output respective probabilities as an estimation result when the attack types are different.

As described above, the estimation device 10 manages the attribute information, the device information, and the observation event information. The attribute information is information in which information of a device such as a device type, firmware, an OS, or an installed application is defined for each device that forms a certain system or service. The device information is information indicating which attribute each device has. The observation event information is information in which an observation event that is likely to occur when being subject to attack is defined for a device or an attribute. The estimation device 10 retrieves observation event information having a matching observation event item and device attribute from the observation event information and the device information on the basis of input information indicating which observation event has occurred in a certain device and estimates which device is subject to which attack. In this way, in the estimation device 10, it is possible to predict the type of attack occurred and the probability on the basis of information observed on a system and find a cyber incident and take countermeasures at an early stage.

Figure 7:
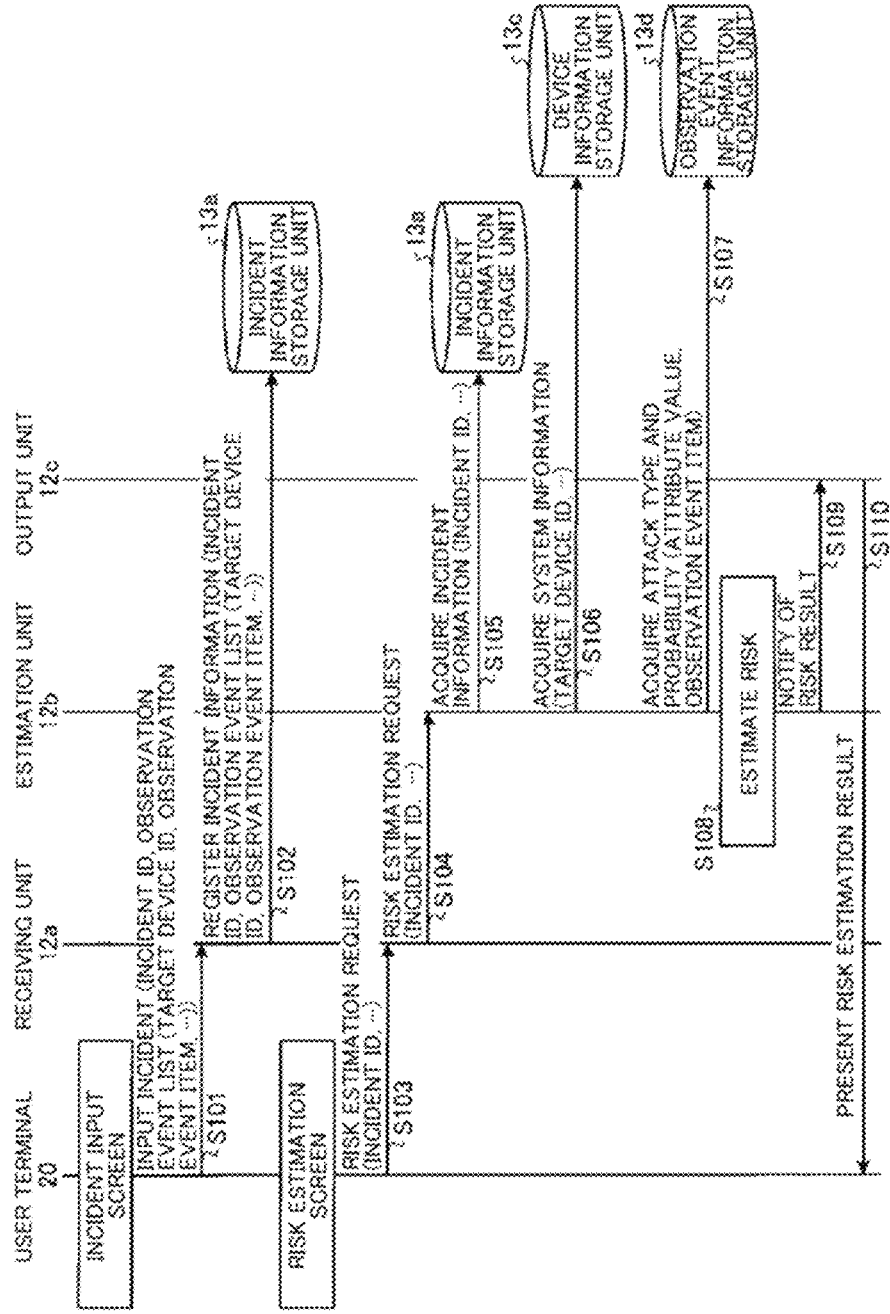
FIG. 7 is a sequence diagram illustrating an example of the flow of processing of the estimation device according to the first embodiment.

[Processing procedure of estimation device] Next, an example of the processing procedure of the estimation device 10 according to the first embodiment will be described with reference to FIG. 7. FIG. 7 is a sequence diagram illustrating an example of the flow of processing of the estimation device according to the first embodiment.

As illustrated in FIG. 7, the receiving unit 12a of the estimation device 10 receives an incident ID and an observation event list including a device ID and an observation event from the user terminal 20 in which an incident input screen is displayed (step S101) and registers the same in the incident information storage unit 13a (step S102). The observation event list may include the date when the observation event was observed and information on the inputting user or the like in addition to the device ID and the observation event.

The receiving unit 12a receives the input of the incident ID included in the risk estimation request from the user terminal 20 in which a risk estimation screen is displayed (step S103) and notifies the estimation unit 12b of the risk estimation request (step S104).

Subsequently, upon receiving the incident ID from the receiving unit 12a, the estimation unit 12b acquires a target device ID and an observation event corresponding to the incident ID from the incident information storage unit 13a (step S105). The estimation unit 12b acquires attribute information of the device corresponding to the acquired target device ID from the device information storage unit 13c (step S106).

After that, the estimation unit 12b acquires the attack type and the probability of being subject to the attack corresponding to the attribute information acquired from the device information storage unit 13c and the observation event received by the receiving unit 12a from the observation event information storage unit 13d (step S107). The estimation unit 12b performs risk estimation of summing the probabilities when there are a number of same attack types, for example (step S108).

The estimation unit 12b notifies the output unit 12 of the attack type and the probability as the risk estimation result (step S109). The output unit 12c outputs the attack type and the probability of being subject to the attack received from the estimation unit 12b to the user terminal 20 as a risk estimation result (step S110).

[Effects of first embodiment] The estimation device 10 according to the first embodiment is a server device that estimates the risk that a device in an observation target network will be subject to attack and outputs the estimated attack risk to the user terminal 20. Specifically, the estimation device 10 receives a device ID for identifying a device in a network and an observation event occurred in the device from the user terminal 20 as an input. The estimation device 10 estimates the risk that a device in a network will be subject to attack on the basis of the attribute information and the observation event of the device corresponding to the device ID and outputs the estimated attack risk to the user terminal 20. In this way, the estimation device 10 can detect which attack will occur at an early stage at a time point when an observation event which is likely to lead to a cyber incident occurs.

[Second embodiment] In the first embodiment, a case in which an attack type and the probability of being subject to the attack are acquired from the observation event information storage unit 13d, and the acquired attack type and the probability of being subject to the attack are output to the user terminal 20 as a risk estimation result has been described. However, there is no limitation thereto. For example, in order to cope with a case in which an attack to be estimated results in a successful attack after taking several steps with respect to an observation event item, the risk that a device in a network will be subject to attack may be estimated on the basis of the probability of state transition in a series of state transitions resulting in an attack.

Therefore, hereinafter, a case in which the estimation device 10 according to the second embodiment defines information in which a Bayesian network representing a series of state transition resulting in an attack is defined, estimates which device is subject to which attack by calculating a state probability and an inter-state transition probability, and outputs a state transition diagram and the calculated state probability as a risk estimation result will be described. Description of the configuration and processing similar to those of the communication system according to the first embodiment will be omitted.

An observation event storage unit 13d of the estimation device 10 according to the second embodiment stores a state transition probability in correlation with the attribute information and the observation event of a device. Specifically, the observation event storage unit 13d stores information in which a state of being subject to attack is defined with respect to a device or an attribute and each state of a process of resulting in the state from an observation event, a device or an attribute of the device, an attack type, and an observation event likely to occur with respect to each state, and transition information indicating to which state and with which probability the present state will transition when the observation event occurs.

Here, an example of the data stored in the observation event information storage unit 13d will be described with reference to FIG. 8. FIG. 8 is a diagram illustrating an example of the data stored in the observation event information storage unit.

For example, as illustrated in FIG. 8, the observation event storage unit 13d stores "state name", "attribute type", "target attribute value/target device ID", "attack type", "state transition diagram", "application of observation event item to state probability", "initial probability", and "transition destination list" in correlation. The "state name" indicates the name of a state. The "attribute type" indicates the type of an attribute. The "target attribute value/target device ID" indicates a device ID or an attribute value of a device that is likely to be subject to attack. The "attack type" indicates the type of attack that a device is likely to be subject to. The "state transition diagram" includes the corresponding state. The "application of observation event item to state probability" defines whether the state probability will be "set" to 100% or "not" when a check item other than unexamined items is present. The "initial probability" indicates a default probability set when the state at the left end of the state transition diagram is set. The "transition destination list" includes information related to a transition destination state.

The observation event storage unit 13d stores "transition destination state name", "transition destination state transition diagram name", "transition probability calculation method", and "observation event list" as the "transition destination list". The "transition destination state name" indicates the name of a transition destination state. The "transition destination state transition diagram name" includes a transition destination state set when transitioning to another transition diagram. The "transition probability calculation method" indicates a method of calculating a probability of state transition to a transition destination. The "observation event list" includes information related to an observation event for calculating a transition probability. For example, in the example of FIG. 8, the observation event storage unit 13d stores "intrusion to AP server" as a transition destination state name of "unauthorized access to servlet container management screen" and stores "addition" as a transition probability calculation method. Either "addition" or "largest value", for example, is set as the transition probability calculation method. When the transition probability calculation method is "addition", the probability of unexamined items is a transition probability when "unexamined" is ON for an observation event item and the sum of the probabilities of checked-ON items is a transition probability when "unexamined" is OFF for an observation event item. Moreover, when the transition probability calculation method is "largest value", the probability of unexamined items is a transition probability when "unexamined" is ON for an observation event item and the largest value among the probabilities of checked-ON items is a transition probability when "unexamined" is OFF for an observation event item.

The observation event storage unit 13d stores "observation event item" indicating the content of an observation event, "observation event type" indicating the type (unexamined or examined item) of an observation event, "initial value" indicating ON/OFF in the initial state, and "probability" when checked-ON as the "observation event list". For example, in the example of FIG. 8, the observation event storage unit 13d stores the observation event item of "unexamined", the observation event type of "unexamined", the initial value of "ON" and the probability of "30%", the observation event item of "attack file has been uploaded through management screen", the observation event type of "examined item", and the initial value of "OFF" and the probability of "40%".

Figure 9:
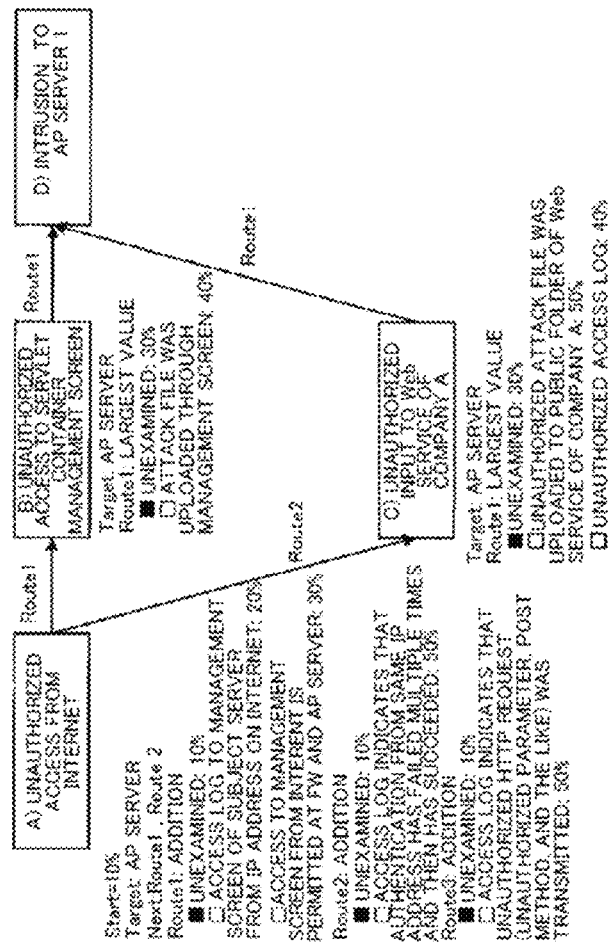
FIG. 9 is a diagram illustrating an example of a state transition diagram.

Next, an example of a state transition diagram will be described with reference to FIG. 9. FIG. 9 is a diagram illustrating an example of a state transition diagram. As illustrated in FIG. 9, in the state transition diagram, "unauthorized access state from Internet", "unauthorized access to servlet container management screen", "unauthorized input to Web service of company A", and "intrusion to AP server 1" are defined as states.

In the example of FIG. 9, there is a possibility that "unauthorized access state from Internet" may transition to "unauthorized access to servlet container management screen" and "unauthorized input to Web service of company A", and "unauthorized access to servlet container management screen" and "unauthorized input to Web service of company A" may transition to "intrusion to AP server 1".

Next, a method in which the estimation device 10 according to the second embodiment estimates the risk from input information will be described. The estimation unit 12b of the estimation device 10 according to the second embodiment retrieves a state corresponding to the attribute information acquired from the device information storage unit 13c and the observation event received by the receiving unit 12a from the observation event information storage unit 13d. Moreover, the estimation unit 12b calculates a probability of state transition from the retrieved state and estimates the risk that a device in a network is subject to attack on the basis of the state transition probability.

Specifically, the estimation unit 12b retrieves a state having a matching observation event item and device or a matching device attribute from the observation event information and the device information on the basis of the input information indicating which observation event has occurred in a certain device and calculates a state probability and an inter-state transition probability.

Figure 10:
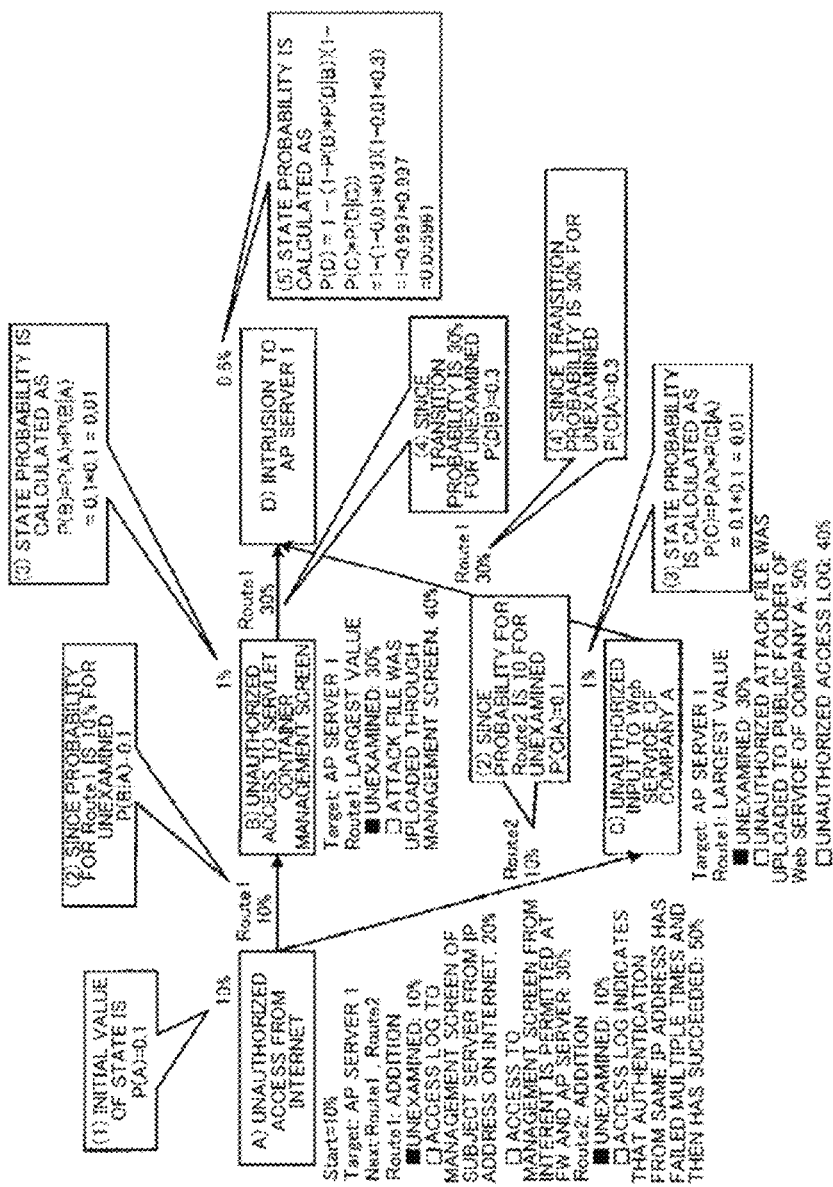
FIG. 10 is a diagram illustrating a risk estimation process when information input by an estimation device according to a second embodiment is not present.

Here, a risk estimation process when information input by the estimation device 10 according to the second embodiment is not present will be described with reference to FIG. 10. FIG. 10 is a diagram illustrating a risk estimation process when information input by the estimation device according to the second embodiment is not present. As illustrated in FIG. 10, the estimation device 10 sets the probability of the initial value of the start state of "unauthorized access state from Internet" at the left end of the state transition diagram to "10%" (see (1) in FIG. 10).

Since the transition probability of "Route1" which is a route of transitioning from the state of "unauthorized access state from Internet" to the state of "unauthorized access to servlet container management screen" is "10%" in the case of unexamined (see (2) in FIG. 10), the estimation device 10 multiplies "0.1" with "0.1" to obtain a state probability of "1%" (see (3) in FIG. 10). Similarly, since the transition probability of "Route2" which is a route of transitioning from the state of "unauthorized access state from Internet" to the state of "unauthorized input to Web service of company A" is "10%" in the case of unexamined (see (2) in FIG. 10), the estimation device 10 multiplies "0.1" with "0.1" to obtain a state probability of "1%" (see (3) in FIG. 10).

Moreover, since the transition probabilities of "Route1" which is a route of transitioning from the state of "unauthorized access to servlet container management screen" and the state of "unauthorized input to Web service of company A" to the state of "intrusion to AP server 1" are "30%" in the case of unexamined (see (4) in FIG. 10), the estimation device 10 calculates "1−(1−0.01×0.3)(1−0.01×0.3) =0.005991" and rounds the number to the fourth decimal place to obtain the probability of "0.6%" of the state "intrusion to AP server 1" (see (5) in FIG. 10). The estimation device 10 outputs the state transition diagram illustrated in FIG. 10 and the calculated state probability to the user terminal 20 as a risk estimation result as the calculation result for the case where input information is not present.

Figure 12:
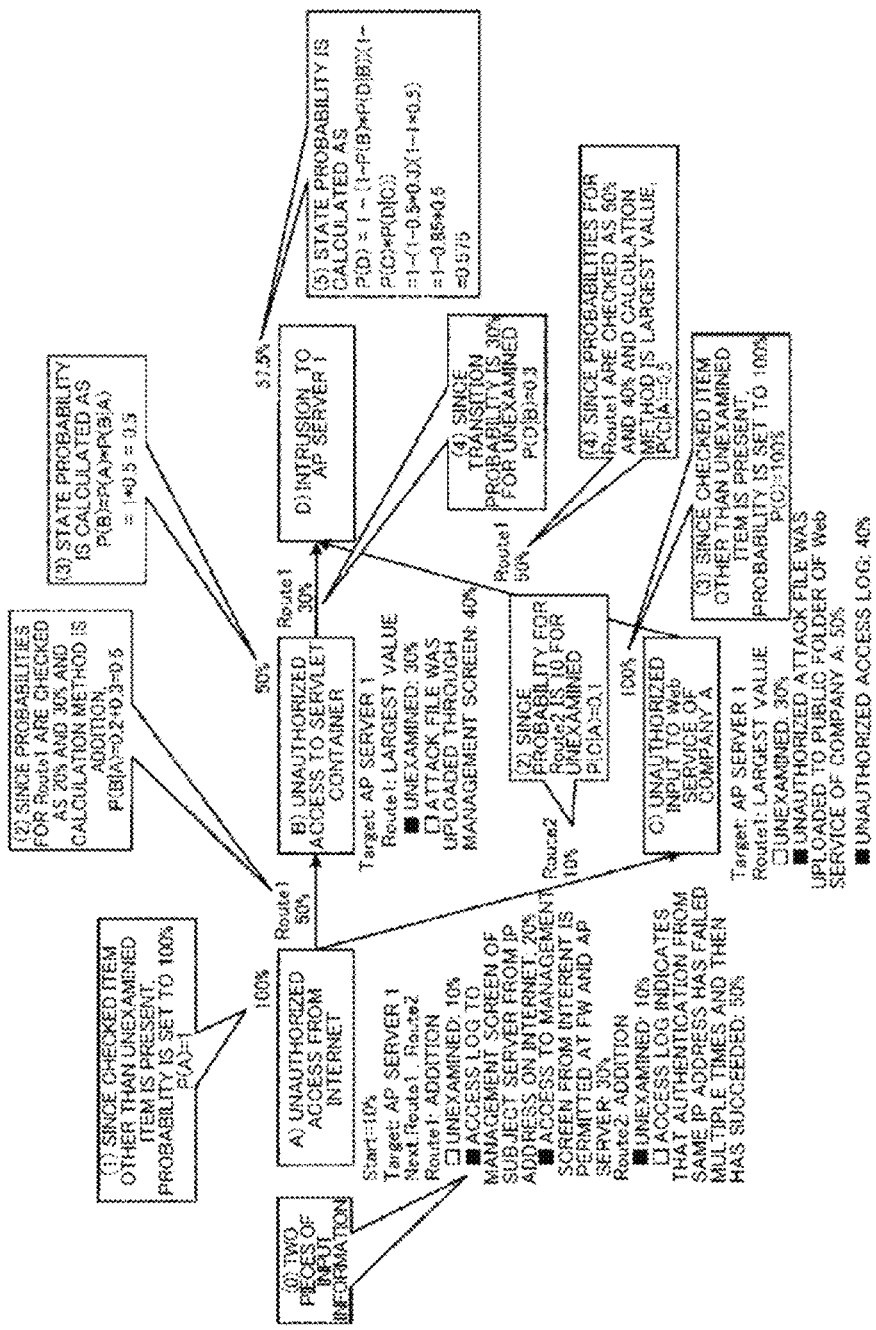
FIG. 12 is a diagram illustrating a risk estimation process when information input the estimation device according to the second embodiment is present.

Next, a risk estimation process when the information input by the estimation device 10 according to the second embodiment is present will be described with reference to FIGS. 11 and 12. FIG. 11 is a diagram illustrating an example of device information retrieval results. FIG. 12 is a diagram illustrating a risk estimation process when information input by the estimation device according to the second embodiment is present.

For example, it is assumed that the estimation device 10 receives the following four pieces of information as the input information.
Target device ID=AP server 1, Observation event item=access log to management screen of subject server from IP address on Internet
Target device ID=AP server 1, Observation event item=access to management screen permitted from the Internet at FW and AP server 1
Target device ID=AP server 1, Observation event item=unauthorized attack file uploaded to public folder of Web service of company A
Target device ID=AP server 1, Observation event item=unauthorized access log The estimation device 10 retrieves a record matching the device ID of "AP server 1" from the device information storage unit 13c. As a result, as illustrated in FIG. 11, the estimation device 10 acquires the "device type" of "server" and "AP server", the "OS type" of "Windows Server 2016", and the "middleware" of "tomcat ver.xxx" from the device information storage unit 13c as the attribute information (attribute type, attribute value) corresponding to the device ID of "AP server 1" (see device information B in FIG. 11).

The estimation device 10 searches the observation event information storage unit 13d using "observation event item=access log to management screen of subject server from IP address on Internet" and acquires "unauthorized access from Internet" as the state of attribute information the same as the attribute information (attribute type, attribute value) of the input information among the retrieved records. Moreover, similarly, the estimation device 10 searches the observation event information storage unit 13d using "observation event item=access to management screen permitted from the Internet at FW and AP server 1" and acquires the state "unauthorized access from Internet" as the state of attribute information the same as the attribute information (attribute type, attribute value) of the input information among the retrieved records.

Moreover, the estimation device 10 searches the observation event information storage unit 13d using "observation event item=unauthorized attack file uploaded to public folder of Web service of company A" and acquires the state "unauthorized input to Web service of company A" as the state of attribute information the same as the attribute information (attribute type, attribute value) of the input information among the retrieved records. Furthermore, the estimation device 10 searches the observation event information storage unit 13d using "observation event item=unauthorized access log" and acquires the state "unauthorized access from Internet" as the state of attribute information the same as the attribute information (attribute type, attribute value) of the input information among the retrieved records.

Subsequently, as illustrated in FIG. 12, the estimation device 10 sets the probability of the state "unauthorized access state from Internet" to "100%" since a check item other than unexamined items is present (see (1) in FIG. 12).

Since the transition probabilities of "Route1" which is a route of transitioning from the state "unauthorized access state from Internet" to the state "unauthorized access to servlet container management screen" are checked as "20%" and "30%", respectively, and the calculation method is addition, the estimation device 10 adds "0.2" and "0.3" (see (2) in FIG. 12) and multiplies "1" with "0.5" to obtain the state probability of "50%" (see (3) in FIG. 12).

Moreover, similarly, the estimation device 10 sets the transition probability of "Route2" which is a route of transitioning from the state "unauthorized access state from Internet" to the state "unauthorized input to Web service of company A" to "10%" in the case of unexamined (see (2) in FIG. 12). Moreover, since a check item other than unexamined items is present, the probability of the state "unauthorized input to Web service of company A" is set to "100%" (see (3) in FIG. 12).

The estimation device 10 sets the transition probability of "Route1" which is a route of transitioning from the state "unauthorized access to servlet container management screen" to the state "intrusion to AP server 1" to "30%" since the transition probability is unexamined (see (4) in FIG. 12). Moreover, the estimation device 10 sets the transition probability of "Route1" which is a route of transitioning from the state "unauthorized input to Web service of company A" to the state "intrusion to AP server 1" to "50%" since the transition probabilities of "Route1" are checked as "50%" and "40%" and the calculation method is the largest value (see (4) in FIG. 12).

The estimation device 10 calculates "1−(1−0.5×0.3)(1−1×0.5)=0.00575" and obtains the probability of "57.5%" of the state "intrusion to AP server 1" (see (5) in FIG. 12). The estimation device 10 outputs the state transition diagram illustrated in FIG. 10 and the calculated state probability to the user terminal 20 as a risk estimation result as the calculation result for the case where input information is not present.

As described above, the estimation device 10 according to the second embodiment retrieves a state having a matching observation event item and device or a matching device attribute from the observation event information and the device information on the basis of the input information indicating which observation event has occurred in a certain device and calculates a state probability and an inter-state transition probability to estimate which device is subject to which attack. The estimation device 10 can present the state transition diagram and the calculated state probability as a risk estimation result.

(System Configuration and the Like)

The components of the devices illustrated in the drawings are functionally conceptual and are not necessarily physically configured as illustrated in the drawings. In other words, the specific aspects of distribution and integration of the devices are not limited to those illustrated in the drawings. All or part of the components may be distributed or integrated functionally or physically in desired units depending on various kinds of loads and states of use, for example. All or desired part of the processing functions performed by the devices are provided by a CPU or a program analyzed and executed by the CPU or as hardware by wired logic.

All or part of the processes described as being automatically performed among the processes described in the present embodiment may be performed manually. Alternatively, all or part of the processes described as being manually performed may be performed automatically by a known method. In addition, the processing procedures, the control procedures, the specific names, and the information including various kinds of data and parameters described in the present specification and the drawings can be arbitrarily changed unless there is any special mention.

(Program)

A program that describes processing executed by the estimation device described in the embodiment in a computer-executable language may be created. For example, an estimation program that describes processing executed by the estimation device 10 according to the embodiment in a computer-executable language may be created. In this case, the same effects as those of the embodiment can be obtained when the computer executes the estimation program. Furthermore, the same effects as those of the embodiment may be realized when the estimation program is recorded on a computer-readable recording medium, and the estimation program recorded on the recording medium is read into and executed by the computer.

Figure 13:
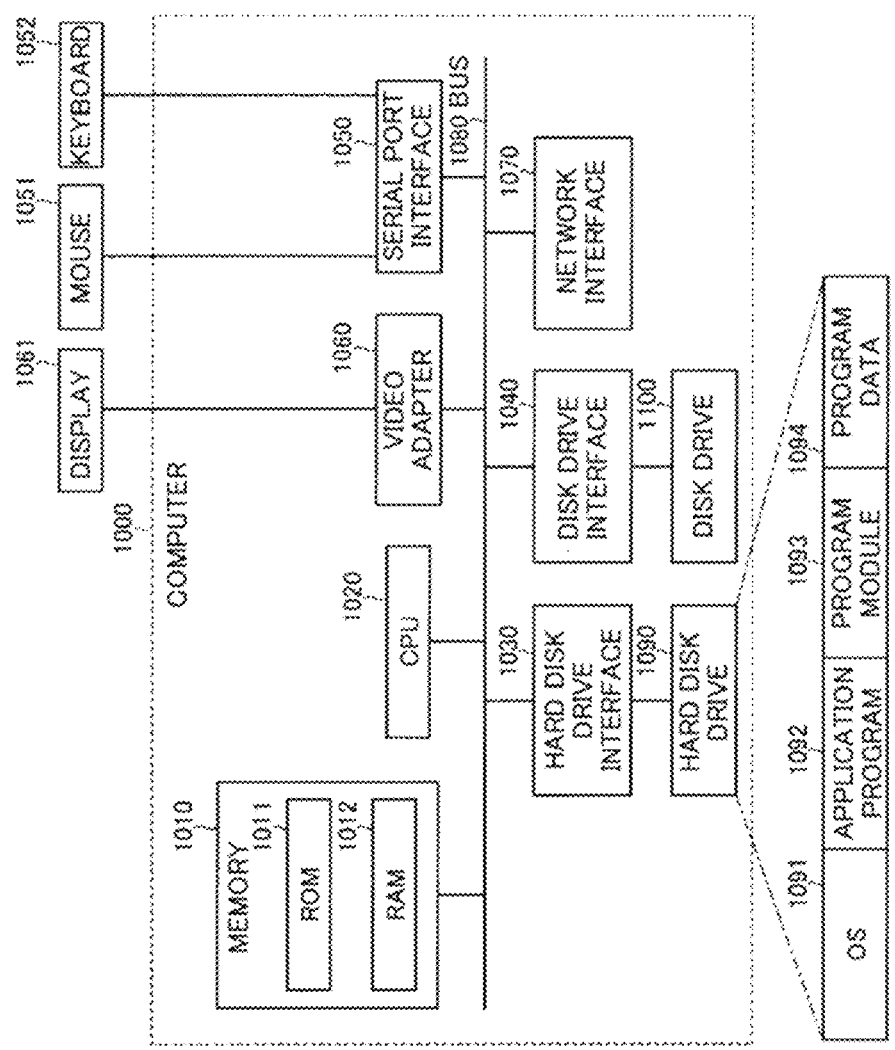
FIG. 13 is a diagram illustrating a computer that executes an estimation program.

FIG. 13 is a diagram illustrating a computer that executes an estimation program. As illustrated in FIG. 13, a computer 1000 includes, for example, a memory 1010, a CPU 1020, a hard disk drive interface 1030, a disk drive interface 1040, a serial port interface 1050, a video adapter 1060, and a network interface 1070. These units are connected by a bus 1080.

The memory 1010 includes a read only memory (ROM) 1011 and a random access memory (RAM) 1012 as illustrated in FIG. 13. The ROM 1011 stores a boot program such as a basic input output system (BIOS), for example. The hard disk drive interface 1030 is connected to a hard disk drive 1090 as illustrated in FIG. 13. The disk drive interface 1040 is connected to a disk drive 1100 as illustrated in FIG. 13. A removable storage medium such as a magnetic disk or an optical disc is inserted into the disk drive 1100. A mouse 1110 and a keyboard 1120, for example, are connected to the serial port interface 1050 as illustrated in FIG. 13. As illustrated in FIG. 13, the video adapter 1060 is connected to a display 1130, for example.

Here, as illustrated in FIG. 13, the hard disk drive 1090 stores therein, for example, an OS 1091, an application program 1092, a program module 1093, and program data 1094. That is, the estimation program is stored in a hard disk drive 1090, for example, as a program module in which commands executed by the computer 1000 are described.

Various types of data described in the embodiment are stored in the memory 1010 and the hard disk drive 1090, for example, as the program data. The CPU 1020 reads the program module 1093 and the program data 1094 stored in the memory 1010 and the hard disk drive 1090 into the RAM 1012 as necessary and performs the above-described processing procedures.

The program module 1093 and the program data 1094 related to the estimation program are not limited to being stored in the hard disk drive 1090, and for example, may be stored in a removable storage medium and read by the CPU 1020 via the disk drive and the like. Alternatively, the program module 1093 and the program data 1094 related to the estimation program may be stored in other computers connected via a network (such as a local area network (LAN) or a wide area network (WAN)) and read by the CPU 1020 via the network interface 1070.

REFERENCE SIGNS LIST

10 Estimation device
11 Communication processing unit
12 Control unit
12*a* Receiving unit
12*b* Estimation unit
12*c* Output unit
13 Storage unit
13*a* Incident information storage unit
13*b* Attribute information storage unit
13*c* Device information storage unit
13*d* Observation event information storage unit
20 User terminal

The invention claimed is:

1. An estimation method executed by an estimation device, the estimation method comprising:
receiving a device ID for identifying a device in a private network and an observation event that has occurred in the device as an input;
acquiring, from a device information memory, attribute information of the device corresponding to the device ID;
estimating a risk that the device in the private network is subject to an attack, based on the acquired attribute information and the observation event, by:
first calculating a first probability that the device is subject to unauthorized access from a public network;
second calculating a second probability, based on the first probability, that the device is subject to unauthorized access to the private network;
third calculating a third probability, based on the first probability, that the device is subject to unauthorized input to network provider of the private network; and
estimating the risk based on the second probability and the third probability; and
outputting a state transition diagram which illustrates a step-by-step process of estimating the risk, the state transition diagram including formulas for the first calculating, the second calculating, the third calculating and the estimating.

2. The estimation method according to claim 1, wherein the estimating further includes:
acquiring a type of an attack, a probability of the device to be subject to the attack corresponding to the attribute information acquired from the device information memory and the observation event acquired from an observation event information memory that stores an attack type, and a probability of being subject to the attack in correlation with attribute information of the device and the observation event, and
the outputting the state transition diagram further includes outputting the attack type and the probability of being subject to the attack.

3. The estimation method according to claim 1, wherein the estimating further includes:
retrieving a state corresponding to the attribute information acquired from the device information memory and the observation event acquired from an observation event information memory that stores a state transition probability in correlation with attribute information of the device and the observation event,
calculating a probability of state transition from the retrieved state, and
estimating the risk that the device in the network is subject to the attack based on the probability of the state transition.

4. The estimation method according to claim 1, wherein the state transition diagram further includes routes between each sequential processing step.

5. The estimation method according to claim 1, wherein the state transition diagram indicates whether an attack file has been examined.

6. The estimation method according to claim 1, wherein the state transition diagram indicates whether an attack file has been detected.

7. The estimation method according to claim 1, wherein the state transition diagram indicates whether an attack file has been uploaded to the device.

8. The estimation method according to claim 1, wherein the state transition diagram indicates whether an attack file has uploaded to public folder of network provider.

9. The estimation method according to claim 1, wherein the state transition diagram indicates whether an access log of the device has been accessed.

10. The estimation method according to claim 1, further comprising:
acquiring information about a plurality of events, wherein the first calculating includes adding probabilities of the plurality of events.

11. The estimation method according to claim 10, wherein the plurality of events are of a same event type.

12. The estimation method according to claim 1, further comprising:
acquiring information about a plurality of events, wherein the first calculating includes determining a largest value of probabilities for each event of the plurality of events.

13. The estimation method according to claim 12, wherein the plurality of events are of a same event type.

14. An estimation device, comprising:
processing circuitry configured to
receive a device ID for identifying a device in a private network and an observation event that has occurred in the device as an input;
acquire, from a device information memory, attribute information of the device corresponding to the device ID;
estimate a risk that the device in the private network is subject to an attack, based on the acquired attribute information and the observation event; and
output a state transition diagram, wherein
to estimate the risk, the circuitry is configured to:
first calculate a first probability that the device is subject to unauthorized access from a public network;
second calculate a second probability, based on the first probability, that the device is subject to unauthorized access to the private network;
third calculate a third probability, based on the first probability, that the device is subject to unauthorized input to network provider of the private network, and
estimates the risk based on the second probability and the third probability, and
the state transition diagram illustrates a step-by-step process of estimating the risk, the state transition diagram including formulas for the first calculation, the second calculation, the third calculation and the estimation of the risk.

15. The estimation device according to claim 14, wherein the state transition diagram further includes routes between each sequential processing step.

16. The estimation device according to claim 14, wherein the state transition diagram indicates whether an attack file has been examined.

17. The estimation device according to claim 14, wherein the state transition diagram indicates whether an attack file has been detected.

18. The estimation device according to claim 14, wherein the state transition diagram indicates whether an attack file has been uploaded to the device.

19. The estimation device according to claim 14, wherein the state transition diagram indicates whether an attack file has uploaded to public folder of network provider.

20. A non-transitory computer readable medium storing computer executable instructions which, when executed by a computer, cause the computer to execute:
receiving a device ID for identifying a device in a private network and an observation event that has occurred in the device as an input;
acquiring, from a device information memory, attribute information of the device corresponding to the device ID;
estimating a risk that the device in the private network is subject to an attack, based on the acquired attribute information and the observation event, by:
first calculating a first probability that the device is subject to unauthorized access from a public network;
second calculating a second probability, based on the first probability, that the device is subject to unauthorized access to the private network;
third calculating a third probability, based on the first probability, that the device is subject to unauthorized input to network provider of the private network; and
estimating the risk based on the second probability and the third probability; and
outputting a state transition diagram which illustrates a step-by-step process of estimating the risk, the state transition diagram including formulas for the first calculating, the second calculating, the third calculating and the estimating.

* * * * *